V. P. McVOY.
CYLINDER RELIEF VALVE.
APPLICATION FILED NOV. 20, 1919.
1,361,738.
Patented Dec. 7, 1920.
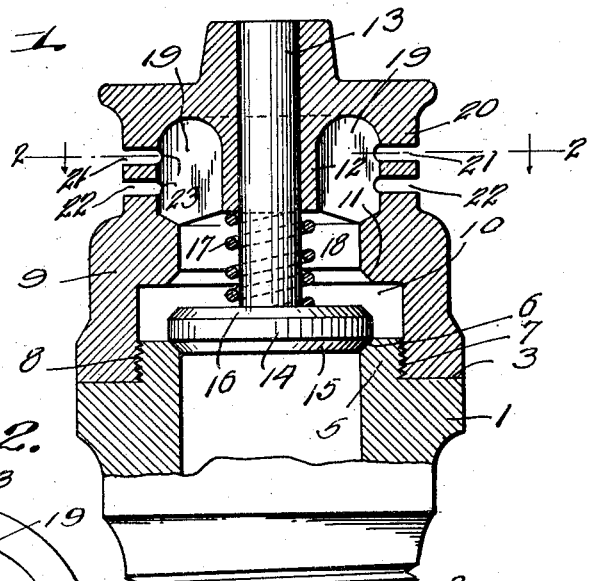
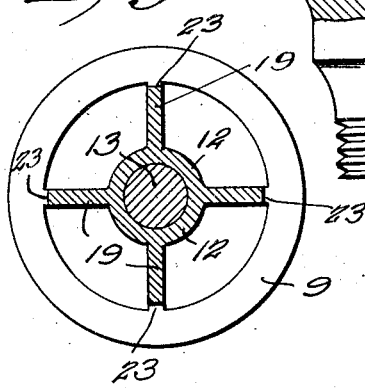
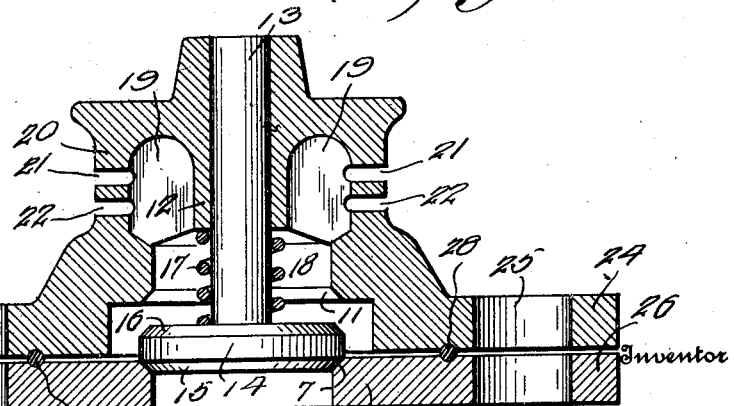
Inventor
Vincent P. McVoy
Witness

UNITED STATES PATENT OFFICE.

VINCEN P. McVOY, OF MOBILE, ALABAMA, ASSIGNOR TO UNITED STATES RAILWAY SUPPLY COMPANY, OF DOVER, DELAWARE, A CORPORATION OF DELAWARE.

CYLINDER RELIEF-VALVE.

1,361,738.        Specification of Letters Patent.       Patented Dec. 7, 1920.

Application filed November 20, 1919. Serial No. 339,525.

*To all whom it may concern:*

Be it known that I, VINCEN P. McVOY, a citizen of the United States, residing at Mobile, in the county of Mobile and State of Alabama, have invented certain new and useful Improvements in Cylinder Relief-Valves, of which the following is a specification.

This invention relates to certain new and useful improvements in cylinder relief valves designed for use primarily upon locomotives, and it has for its objects among others to provide an improved valve which shall serve not only as a relief valve but also to prevent air from entering the cylinders while the engine is drifting, being especially adapted for use in connection with drifting valves where it is desirable to prevent air from entering the cylinders at all times, as the presence of such air is detrimental to the lubrication and also to the reciprocating parts of the engine.

I employ a double-faced valve adapted to either of two seats and normally under sufficient pressure to prevent any leakage of steam from the cylinders until such pressure exceeds a predetermined amount, when it will be forced from its seat against the force that normally holds it to its seat to allow of the escape of the surplus leakage of steam to prevent the engine from moving when the throttle is closed due to leakage of throttle. When the throttle is opened, the rush of steam will be sufficient to overcome this escape and force the valve to its other seat, thus the valve remains seated in its last-named position until the throttle is again closed, when the valve assumes its normal position.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this specification, and in which—

Figure 1 is a substantially central longitudinal section through my improved valve with a portion broken away and a part shown in elevation.

Fig. 2 is a cross section on the line 2—2 of Fig. 1, looking in the direction of the arrows.

Fig. 3 is a substantially central vertical section through a slightly modified form, but involving all of the essential features of that shown in Figs. 1 and 2.

Like numerals of reference indicate like parts throughout the different views.

Referring to the drawings,

Taking first Figs. 1 and 2, 1 designates the lower body portion having screw-threaded terminal 2 whereby it may be screwed into the cylinder of the engine. This portion 1 is formed with a peripheral offset 3 forming a shoulder for a purpose soon to be described, and a bore 4 surrounded by the tubular extension 5 upon the outer end of which is formed a seat 6. The extension 5 is screw-threaded, as at 7, to receive the threaded portion 8 of the other member 9 of the valve, which member 9 is provided with the chamber 10 and a valve seat 11. This upper portion is provided with the axial tubular portion 12 which serves to guide the stem 13 of the valve 14 which is provided with two faces 15 and 16 adapted to seat upon the seats 6 and 11, respectively, being shown in Fig. 1 as seated upon the former. Around this stem 13 is a spring 17 confined between the outer end of the valve and the inner end of the tubular portion 12. The portion 9 is chambered, as at 18, adjacent the valve seat 11, and beyond this chamber is provided with ribs 19, as seen best in Fig. 2.

The shell 20 of the portion 9 is provided with annular slots 21 and 22, as seen clearly in Fig. 1, which extend through the shell and into the web 19, as seen at 23 in Figs. 1 and 2, it being understood that the extension of these openings or slots into these webs does not, in the least, interfere with the strength of the member 9, yet permits me to simplify the manufacture of this portion of the device by simply cutting these slots or openings with an ordinary cutting-off tool and yet obtain the requisite strength.

In some instances, the valve would be used in places where it could not be screwed to place and where it would be necessary to secure it with other means, such as bolts, studs or cap screws. In Fig. 3 I have shown a construction of valve adapted for such application. In this form, all the essentials of the valve as shown in Fig. 1 are present and bear the same reference characters, but, in lieu of the screw-threaded member 2, I provide the body portion 9 with flanges or lugs 24 having openings 25 for the reception of the studs, bolts, cap screws, or other securing means, while the lower portion 1 is provided with corresponding lugs or flanges 26 having openings 27 coincident with the openings 25, it being understood that the two members 1 and 9 are secured to the cylinder or other part, not shown, to which it is desired that the same may be affixed.

In this form I employ a gasket or the like 28, preferably in the form of a copper wire, between the adjacent faces of the parts 1 and 9, as seen in Fig. 3.

It is to be understood that the operation of the form shown in Fig. 3 is identical with that of the form shown in Figs. 1 and 2, and in view of the previous explanation it is thought that a further detailed description of the operation is not necessary.

Modifications in detail may be resorted to without departing from the spirit of the invention or sacrificing any of its advantages.

What is claimed as new is:—

1. A cylinder relief valve comprising a body portion having opposed seats, a two-faced reciprocatory valve therein adapted to seat on either of said seats, and means to normally hold said valve against one of said seats to prevent leakage of steam from the cylinder under slight pressure, said valve being movable under excess pressure to be forced from said seat to relieve such pressure, and forced to the other seat when the engine is working under pressure.

2. A cylinder relief valve comprising a body portion having opposed seats and open to the atmosphere beyond the outermost seat, a two-faced reciprocatory valve therein adapted to seat on either of said seats, and means to normally hold said valve against one of said seats to prevent leakage of steam from the cylinder under slight pressure, said valve being movable under excess pressure to be forced from said seat to relieve such pressure, and forced to the other seat when the engine is working under pressure.

3. A cylinder relief valve comprising a body portion having opposed seats, a two-faced reciprocatory valve therein adapted to seat on either of said seats, and means to normally hold said valve against one of said seats to prevent leakage of steam from the cylinder under slight pressure, said valve being movable under excess pressure to be forced from said seat to relieve such pressure, and forced to the other seat when the engine is working under pressure and to prevent ingress of air to the cylinder when drifting.

4. A cylinder relief valve comprising a body portion having opposed seats and annular slots beyond the outermost seat to provide opening to the atmosphere, a double-faced valve reciprocatory in said body portion and adapted to seat on either of said seats, and means to normally hold said valve to one of said seats to prevent leakage of steam from the cylinder under slight pressure and to prevent ingress of air to the cylinder when the engine is drifting, said valve being adapted to be forced to the other seat when the engine is working under pressure.

In testimony whereof I affix my signature.

VINCEN P. McVOY.